US012095761B2

United States Patent
Hassani et al.

(10) Patent No.: US 12,095,761 B2
(45) Date of Patent: Sep. 17, 2024

(54) ENHANCED BIOMETRIC AUTHORIZATION

(71) Applicant: Ford Global Technologies, LLC, Dearborn, MI (US)

(72) Inventors: Ali Hassani, Ann Arbor, MI (US); Jake Schwartz, Dearborn, MI (US); Medha Karkare, Canton, MI (US); Justin Miller, Berkley, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 299 days.

(21) Appl. No.: 17/540,321

(22) Filed: Dec. 2, 2021

(65) Prior Publication Data

US 2023/0198983 A1 Jun. 22, 2023

(51) Int. Cl.
*H04L 9/40* (2022.01)

(52) U.S. Cl.
CPC .......... *H04L 63/0861* (2013.01); *H04L 63/20* (2013.01)

(58) Field of Classification Search
None
See application file for complete search history.

(56) References Cited

U.S. PATENT DOCUMENTS

| | | |
|---|---|---|
| 6,100,811 A | 8/2000 | Hsu et al. |
| 8,296,573 B2 | 10/2012 | Bolle et al. |
| 9,071,602 B2 | 6/2015 | Kamakura |
| 9,239,945 B2 | 1/2016 | Hama |
| 9,461,992 B2 | 10/2016 | Outwater et al. |
| 9,576,121 B2 | 2/2017 | Cao |
| 9,688,225 B2 | 6/2017 | Byrne et al. |
| 10,164,973 B1 | 12/2018 | Prasad et al. |
| 10,248,771 B1 | 4/2019 | Ziraknejad et al. |
| 10,414,377 B2 | 9/2019 | Hoyos et al. |
| 10,464,530 B2 | 11/2019 | Falkson et al. |
| 10,742,410 B2 | 8/2020 | Gehrmann et al. |

(Continued)

FOREIGN PATENT DOCUMENTS

WO 2021094774 A1 5/2021

OTHER PUBLICATIONS

Non-Final Office Action mailed Jul. 14, 2023 re U.S. Appl. No. 17/540,394, filed Dec. 2, 2021.

(Continued)

*Primary Examiner* — James R Turchen
(74) *Attorney, Agent, or Firm* — Frank Lollo; Bejin Bieneman PLC (57) ABSTRACT

A first computer and a second computer are each connected to a communication network. User data is generated for a user by the first computer based on receiving, from the second computer, initial enrollment biometric data for the user. The user is authorized by the first computer based on a confidence score for challenge biometric data exceeding a first confidence threshold. Then the user data is updated with updated enrollment biometric data by the first computer based on a confidence score for the updated enrollment biometric data exceeding a second confidence threshold. The second confidence threshold is greater than the first confidence threshold. The initial enrollment biometric data is deleted by the second computer after a predetermined time of receiving the initial enrollment biometric data.

20 Claims, 6 Drawing Sheets

(56) References Cited

U.S. PATENT DOCUMENTS

| | | | |
|---|---|---|---|
| 10,902,237 B1* | 1/2021 | Aggarwal | G06V 40/1365 |
| 10,970,516 B2 | 4/2021 | Schwartz et al. | |
| 11,017,203 B1* | 5/2021 | Aggarwal | G06V 40/1365 |
| 2006/0294393 A1 | 12/2006 | McCall | |
| 2008/0059805 A1* | 3/2008 | Yoshioka | G06F 18/28 |
| | | | 713/186 |
| 2015/0286811 A1 | 10/2015 | Phan et al. | |
| 2016/0065666 A1 | 3/2016 | Lim et al. | |
| 2017/0063850 A1* | 3/2017 | Cartaya | G06F 21/32 |
| 2017/0132408 A1* | 5/2017 | Kim | G06F 21/32 |
| 2018/0272945 A1 | 9/2018 | Worthen et al. | |
| 2018/0365402 A1* | 12/2018 | Ko | G06F 21/32 |
| 2019/0005217 A1* | 1/2019 | Kim | G06F 18/2411 |
| 2019/0362333 A1 | 11/2019 | Agarwal | |
| 2020/0082062 A1 | 3/2020 | Mequanint et al. | |
| 2020/0311509 A1 | 10/2020 | Benkley, III et al. | |
| 2020/0320181 A1 | 10/2020 | Deutschmann et al. | |
| 2021/0053530 A1 | 2/2021 | Bohl et al. | |
| 2021/0182373 A1 | 6/2021 | Tussy | |
| 2021/0229673 A1 | 7/2021 | Singh et al. | |
| 2021/0309181 A1 | 10/2021 | Kale et al. | |
| 2022/0019646 A1 | 1/2022 | Bielby et al. | |
| 2022/0108701 A1* | 4/2022 | Gupta | H04M 3/5166 |
| 2022/0219643 A1 | 7/2022 | Hanson et al. | |
| 2022/0245546 A1 | 8/2022 | Castinado et al. | |
| 2022/0253514 A1* | 8/2022 | Ackerman | G06V 40/50 |
| 2022/0300593 A1 | 9/2022 | Brownlee | |
| 2023/0145344 A1 | 5/2023 | Okuyama | |
| 2023/0162695 A1 | 5/2023 | Chau et al. | |

OTHER PUBLICATIONS

Non-Final Office Action mailed Nov. 24, 2023 re U.S. Appl. No. 17/540,432, filed Dec. 2, 2021.

Final Office Action mailed Mar. 14, 2024 re U.S. Appl. No. 17/540,432, filed Dec. 2, 2021.

Non-Final Office Action mailed Jan. 4, 2024 re U.S. Appl. No. 17/540,408, filed Dec. 2, 2021.

* cited by examiner

ENHANCED BIOMETRIC AUTHORIZATION

BACKGROUND

A computer performing biometric authorization can receive sensor data to determine an identity of a person seeking authorization for access to be granted by the computer. Biometric authorization can include, for example, facial recognition, a type of biometric authorization where an image of a human face is used to identify a person. Biometric authorization can rely upon acquiring accurate biometric data.

DETAILED DESCRIPTION

Biometric authorization can be used by a computer to control access to devices, objects, and/or applications, e.g., to vehicles, buildings, computers, cell phones, other devices, etc. For example, biometric authorization can be implemented to permit authorized people to access, e.g., to a vehicle or building, and to deny access to unauthorized people. Biometric authorization may require that a user provide one or more types of biometric data and/or to provide the biometric data in a specific manner, e.g., in a specified sequence, to a specified sensor, etc., to generate user data that can be used to determine authorization. Biometric data is data representing measurements of physiological characteristics. A type of biometric data is data representing a specific physiological characteristic, e.g., distances between ridges in a fingerprint, distances between facial features, etc. Biometric authorization can authorize users by comparing the biometric data provided by the user to biometric data subsequently obtained via sensors in the vehicle, building, computing device, etc.

The results of performing the biometric authorization can be downloaded to a device granting or denying authorization and permission to access a structure, for example, a vehicle, a building, a room, etc. Successful authorization can be used for security applications such as access to a location, e.g., a passenger cabin of a vehicle, a room, a building, etc., by unlocking a door. In other examples, successful authorization can be used to enable vehicle or building controls, or yet further alternatively or additionally access to a device such as a computer by enabling input devices like a keyboard or mouse, or granting access to computer files.

Authorizing users for vehicles will be described herein as a non-limiting example of biometric authorization. That is, a vehicle will be described herein as a non-limiting example of a structure. It is to be understood that other types of structure, e.g., a building, may utilize the techniques described herein for biometric authorization.

Vehicles can be equipped with computing devices, networks, sensors, and controllers to acquire and/or process data regarding the environment and to permit access to the vehicle based on the data. For example, a camera in a vehicle can be programmed to acquire an image of an approaching user and, upon determining the identity of the user based on biometric authorization, e.g., via facial recognition software, unlock a door to permit the user to enter a passenger cabin of the vehicle. Likewise, cameras included in the passenger cabin of the vehicle can acquire one or more images of a user and, upon determining the identity of the user based on biometric authorization, e.g., via facial recognition software, accept commands from the user to operate the vehicle.

A vehicle computer can generate user data for biometric authorization (as discussed below) based on receiving initial enrollment biometric data from a remote computer. However, the initial enrollment biometric data may be obtained via sensors having different parameters (e.g., physical characteristics such as resolution, sensing media, size, shape, etc.) than vehicle sensors, which can affect the accuracy of biometric authorization. Advantageously, upon obtaining challenge biometric data via vehicle sensors, the vehicle computer can biometrically authorize a user based on a confidence score for the challenge biometric data exceeding a first confidence threshold. The vehicle computer can then obtain updated enrollment biometric data for the user via vehicle sensors and update the user data based on a confidence score for the updated enrollment biometric data exceeding a second confidence threshold that is greater than the first confidence threshold. Authorizing the user based on the first, i.e., lower, threshold allows the vehicle computer to permit limited access to the vehicle, e.g., the user may physically access a passenger cabin but may be unable to operate the vehicle. Updating the user data with the updated enrollment biometric data based on the second, i.e., higher, threshold allows the vehicle computer to improve the accuracy of biometrically authorizing a user as compared to utilizing the initial enrollment biometric data and the first confidence threshold. Additionally, the vehicle computer can update the user data without input from the user, which can allow the user to begin operating the vehicle more quickly as compared to generating the user data based on obtaining the biometric data via vehicle sensors.

A system includes a communication network. The system further includes a first computer and a second computer each connected to the communication network. The first computer is programmed to generate user data for a user based on receiving, from the second computer, initial enrollment biometric data for the user. The first computer is further programmed to authenticate the user based on a confidence score for challenge biometric data exceeding a first confidence threshold. The first computer is further programmed to then update the user data with updated enrollment biometric data based on a confidence score for the updated enrollment biometric data exceeding a second confidence threshold. The second confidence threshold is greater than the first confidence threshold. The second computer is programmed to delete the initial enrollment biometric data after a predetermined time of receiving the initial enrollment biometric data.

The first computer can be further programmed to, upon authenticating the user, permit the user to access a structure.

The first computer can be further programmed to prevent the user from accessing a structure based on failing to authenticate the user within a second predetermined time of receiving the initial enrollment biometric data.

The first computer can be further programmed to, upon determining to not authenticate the user, prevent the user from accessing a structure.

The first computer can be further programmed to, upon updating the user data, permit the user to access a structure based on the updated user data.

The first computer can be further programmed to prevent the user from operating controls for a structure based on the confidence score for the updated enrollment biometric data not exceeding the second confidence threshold.

The first computer can be further programmed to update the user data based additionally on receiving a user input.

The first computer can be further programmed to update the user data based additionally on authorizing a portable device associated with the user.

The first computer can be further programmed to, after updating the user data, obtain future challenge biometric data based on detecting the user. The first computer can be further programmed to authorize the user based on a confidence score for the future challenge biometric data exceeding the second confidence threshold.

The first computer can be further programmed to, upon authorizing the user, permit the user to at least one of access a structure and operate controls for the structure on the updated user data.

The first computer can be further programmed to, upon determining to not authorize the user, prevent the user from accessing a structure.

The future challenge biometric data may be obtained from at least one of exterior sensors positioned to face an environment around a structure and interior sensors positioned to face an area defined by the structure.

The challenge biometric data may be obtained from exterior sensors positioned to face an environment around a structure. The updated enrollment biometric data may be obtained from the exterior sensors and interior sensors positioned to face an area defined by the structure.

The second computer can be further programmed to delete the initial enrollment biometric data based on providing the initial enrollment biometric data to the first computer.

The second computer can be further programmed to receive the initial enrollment biometric data from a third computer.

A method includes generating, at a first computer, user data for a user based on receiving, from a second computer, initial enrollment biometric data for the user. The method further includes authenticating the user based on a confidence score for challenge biometric data exceeding a first confidence threshold. The method further includes then updating the user data with updated enrollment biometric data based on a confidence score for the updated enrollment biometric data exceeding a second confidence threshold. The second confidence threshold is greater than the first confidence threshold. The method further includes deleting, at the second computer, the initial enrollment biometric data after a predetermined time of receiving the initial enrollment biometric data.

The method can further include preventing, at the first computer, the user from operating controls for a structure based on the confidence score for the updated enrollment biometric data not exceeding the second confidence threshold.

The method can further include, after updating the user data, obtaining, at the first computer, future challenge biometric data based on detecting the user. The method can further include authorizing the user based on a confidence score for the future challenge biometric data exceeding the second confidence threshold.

The method can further include, upon authorizing the user, permitting, at the first computer, the user to at least one access a structure and to operate controls for the structure based on the updated user data.

The method can further include deleting, at the second computer, the initial enrollment biometric data based on providing the initial enrollment biometric data to the first computer.

Further disclosed herein is a computing device programmed to execute any of the above method steps. Yet further disclosed herein is a computer program product, including a computer readable medium storing instructions executable by a computer processor, to execute an of the above method steps.

With reference to FIGS. 1-4, an example control system 100 includes a vehicle 105. The control system 100 includes a communication network 135, e.g., a packet network. A first computer 110 in the vehicle 105, i.e., a vehicle computer 110, and a second computer 140, 145 remote from the vehicle 105 are each connected to the communication network 135. The vehicle computer 110 receives data from sensors 115. The vehicle computer 110 is programmed to generate user data for a user based on receiving, from the second computer 140, 145, initial enrollment biometric data for the user. The vehicle computer 110 is further programmed to authorize the user based on a confidence score for challenge biometric data exceeding a first confidence threshold. The vehicle computer 110 is further programmed to then update the user data with updated enrollment biometric data based on a confidence score for the updated enrollment biometric data exceeding a second confidence threshold. The second confidence threshold is greater than the first confidence threshold. The second computer 140, 145 is programmed to delete the initial enrollment biometric data after a predetermined time of receiving the initial enrollment biometric data.

Figure 1:
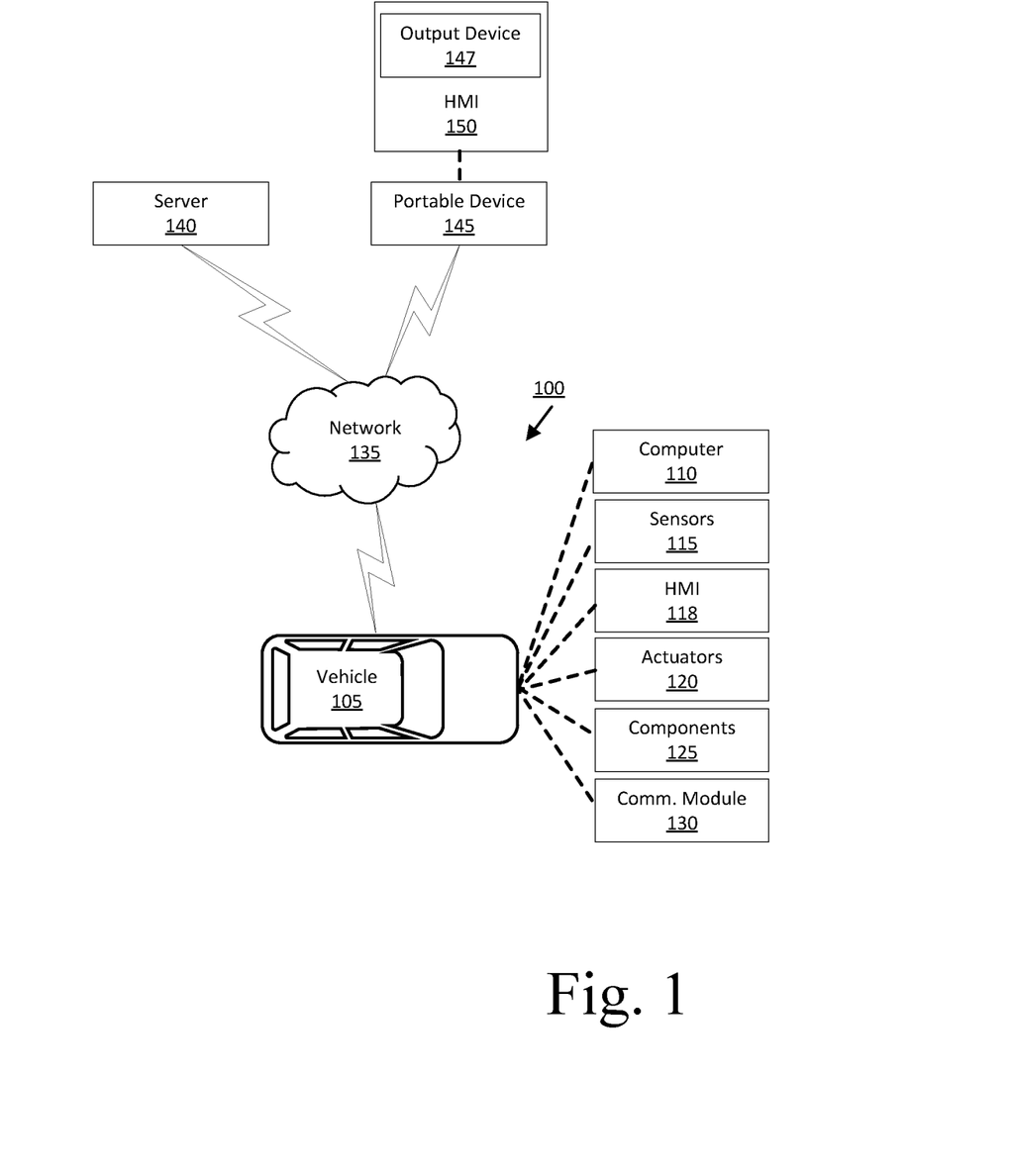
FIG. 1 is a block diagram illustrating an example control system for a vehicle.

Turning now to FIG. 1, the vehicle 105 includes the vehicle computer 110, sensors 115, actuators 120 to actuate various vehicle components 125, and a vehicle 105 communication module 130. The communication module 130 allows the vehicle computer 110 to communicate with a remote server computer 140, and/or other vehicles, e.g., via a messaging or broadcast protocol such as Dedicated Short Range Communications (DSRC), cellular, and/or other protocol that can support vehicle-to-vehicle, vehicle-to infra-structure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above and/or may include a dedicated electronic circuit including an ASIC that is manufactured for a particular operation, e.g., an ASIC for processing sensor 115 data and/or communicating the sensor 115 data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the vehicle computer 110.

The vehicle computer 110 may operate and/or monitor the vehicle 105 in an autonomous mode, a semi-autonomous mode, or a non-autonomous (or manual) mode, i.e., can control and/or monitor operation of the vehicle 105, including controlling and/or monitoring components 125. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communication network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, actuators 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor 115(s), etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g. front view, side view, etc., providing images from an area surrounding the vehicle 105. As another example, the vehicle 105 can include one or more sensors 115, e.g., camera sensors 115, mounted inside a cabin of the vehicle 105 and oriented to capture images of users in the vehicle 105 cabin. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115, e.g., substantially continuously, periodically, and/or when instructed by a remote server computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS) and/or dead reckoning. Additionally, or alternatively, the data can include a location of an object, e.g., a vehicle 105, a sign, a tree, etc., relative to the vehicle 105. As one example, the data may be image data of the environment around the vehicle 105. In such an example, the image data may include one or more objects and/or markings, e.g., lane markings, on or along a road. As another example, the data may be image data of the vehicle 105 cabin, e.g., including users and seats in the vehicle 105 cabin. Image data herein means digital image data, i.e., comprising pixels, typically with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle 105 subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

The vehicle 105 further includes a human-machine interface (HMI) 118. The HMI 118 includes user input devices such as knobs, buttons, switches, pedals, levers, touchscreens, and/or microphones, etc. The input devices may include sensors 115 to detect a user input and provide user input data to the vehicle computer 110. That is, the vehicle computer 110 may be programmed to receive user input from the HMI 118. The user may provide the user input via the HMI 118, e.g., by selecting a virtual button on a touchscreen display, by providing voice commands, etc. For example, a touchscreen display included in an HMI 118 may include sensors 115 to detect that a user selected a virtual button on the touchscreen display to, e.g., select or deselect an operation, which input can be received in the vehicle computer 110 and used to determine the selection of the user input.

The HMI 118 typically further includes output devices such as displays (including touchscreen displays), speakers, and/or lights, etc., that output signals or data to the user. The HMI 118 is coupled to the vehicle communication network and can send and/or receive messages to/from the vehicle computer 110 and other vehicle sub-systems.

In addition, the vehicle computer 110 may be configured for communicating via a vehicle-to-vehicle communication module or interface with devices outside of the vehicle 105, e.g., through a vehicle-to-vehicle (V2V) or vehicle-to-infrastructure (V2X) wireless communications (cellular and/or DSRC, etc.) to another vehicle, and/or to a remote server computer 140 (typically via direct radio frequency communications). The communication module could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module include cellular, Bluetooth, IEEE 802.11, Ultra-Wideband (UWB), Near Field Communication (NFC), dedicated short range communications (DSRC), and/or wide area networks (WAN), including the Internet, providing data communication services.

The network 135 represents one or more mechanisms by which a vehicle computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks 135 include wireless communication networks (e.g., using Bluetooth®, Bluetooth® Low Energy (BLE), UWB, NFC, IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or some other wide area network.

The portable device 145 can be a conventional computing device, i.e., including one or more processors and one or more memories, programmed to provide operations such as disclosed herein. The portable device 145 can be any one of a variety of computers that can be used while carried by a person, e.g., a smartphone, a tablet, a personal digital assistant, a smart watch, a key fob, etc. Further, the portable device 145 can be accessed via the network 135, e.g., the Internet, a cellular network, and/or or some other wide area network.

Figure 4:
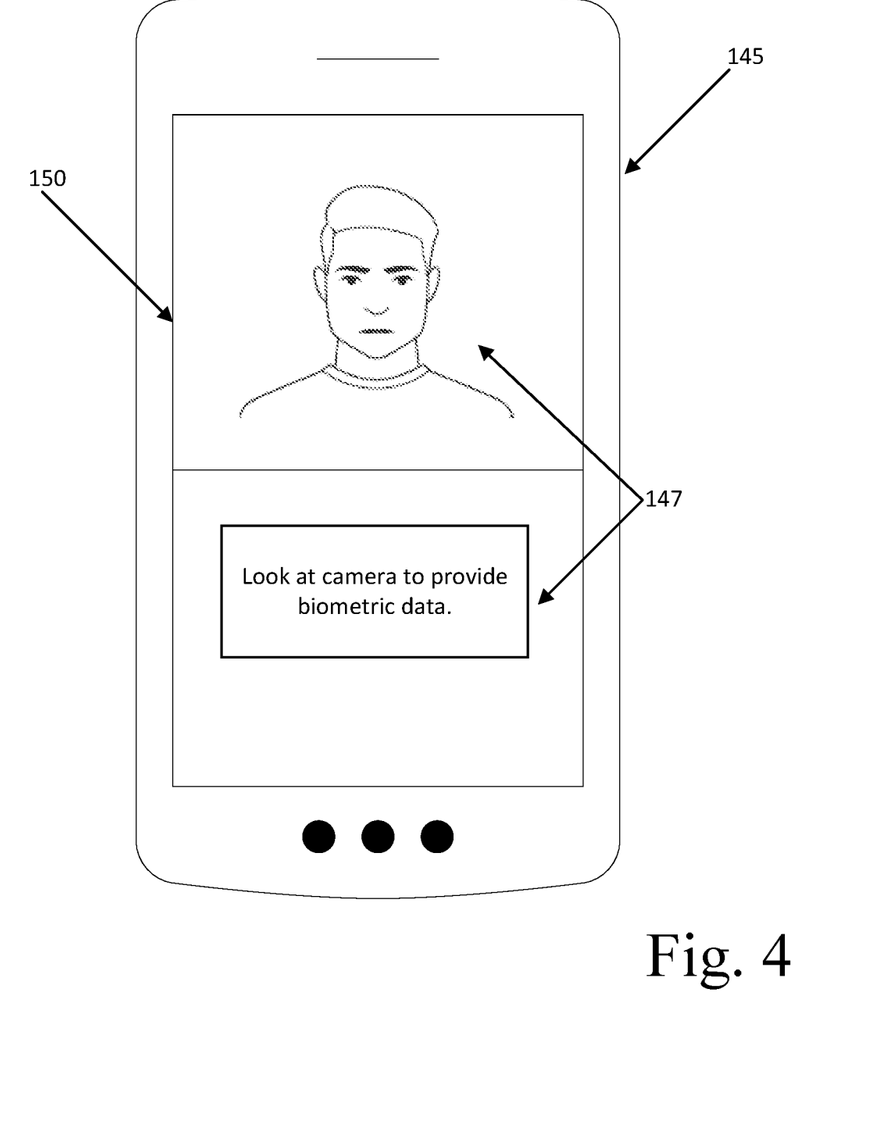
FIG. 4 is a diagram illustrating an exemplary portable device.

The portable device 145 includes one or more output devices 147 such as displays (including touchscreen displays), speakers, and/or lights, etc., that output signals or data to the user. For example, the portable device 145 may include an HMI 150 having the output device(s) 147. The HMI 150 of the portable device 145 has features in common with the HMI 118 of the vehicle computer 110, e.g., input devices and output devices, and therefore will not be described further to avoid redundancy.

Figure 2:
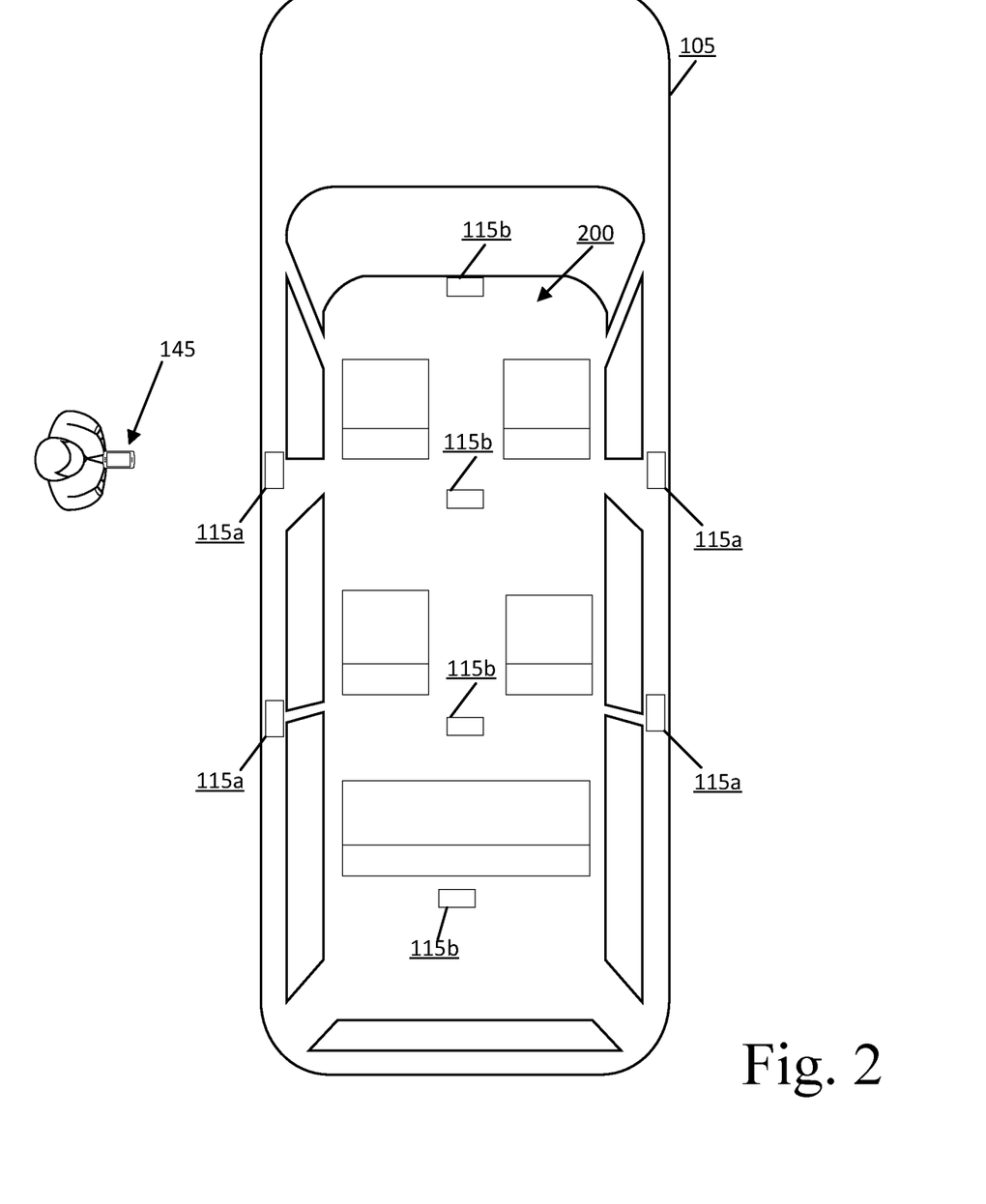
FIG. 2 is a diagram illustrating an exemplary passenger cabin of the vehicle.

FIG. 2 is a diagram of a top view of an example passenger cabin 200 of an example vehicle 105. The vehicle 105 may include a body (not numbered) defining the passenger cabin 200 to house occupants, if any, of the vehicle. The body includes doors and windows that can be opened, e.g., to allow ingress and egress from the passenger cabin 200.

The passenger cabin 200 may extend across the vehicle 105, i.e., from one side to the other side of the vehicle 105. The passenger cabin 200 includes a front end (not numbered) and a rear end (not numbered) with the front end being in front of the rear end during forward movement of the vehicle 105. The passenger cabin 200 includes one or more seats (not numbered). The seats may be arranged in any suitable arrangement. For example, the passenger cabin 200 may include one or more front seats disposed at a front of the passenger cabin 200 and one or more back seats disposed behind the front seats. The passenger cabin 200 may also include third-row seats at the rear of the passenger cabin 200. In FIG. 2, the front seats and back seats are shown to be bucket seats and the third-row seats are shown to be bench seats, but the seats may be other types.

The vehicle 105 may include any suitable number of sensors 115, e.g., one or more. For example, as illustrated in FIG. 2, the vehicle 105 may include a plurality of external sensors 115a that are positioned to monitor an environment around the vehicle 105, and a plurality of internal sensors 115b that are positioned to monitor the passenger cabin 200 of the vehicle 105.

The vehicle computer 110 is programmed to receive, from the second computer 140, 145, initial enrollment biometric data for a user (as discussed below). Initial enrollment biometric data herein means biometric data received by the vehicle computer 110 to initiate biometric enrollment (as discussed below) for the user. Initial enrollment biometric data is obtained prior to generation of user data (as discussed below) for the user. For example, the vehicle computer 110 can monitor the network 135 to detect the initial enrollment biometric data. As one example, the vehicle computer 110 can receive, e.g., via the network 135, the initial enrollment biometric data from an authorized portable device 145 (as discussed below) associated with the user. As another example, the vehicle computer 110 can receive the initial enrollment biometric data from the remote server computer 140, e.g., via the network 135. In such an example, the remote server computer 140 may receive the initial enrollment biometric data from the authorized portable device 145. Alternatively, the remote server computer 140 can select the initial enrollment biometric data from a database, e.g., stored in a memory of the remote server computer 140, associating biometric data, e.g., image data, with a plurality of users, as discussed below.

The vehicle computer 110 may be programmed to authorize a portable device 145. Authorizing the portable device 145 means the vehicle computer 110 determining that the portable device 145 has permission to communicate with the vehicle computer 110; a failure to authorize occurs upon a determination that the portable device 145 lacks permission to communicate with the vehicle computer 110. Upon authorizing the portable device 145, the vehicle computer 110 may provide a message requesting the initial enrollment biometric data from the portable device 145, e.g., by transmitting the message via the network 135.

The vehicle computer 110 can detect the portable device 145. For example, the vehicle computer 110 may be programmed to transmit, e.g., via a short-range broadcast protocol, a radio frequency (RF) signal, e.g., BLE, Ultra-Wideband (UWB), etc. The vehicle computer 110 can then detect the portable device 145 based on detecting either the return of the respective transmitted RF signal or a response RF signal transmitted from the portable device 145, e.g., continuously or in response to detecting the RF signal transmitted by the vehicle computer 110. In an example in which the remote server computer 140 receives the initial enrollment biometric data from the portable device 145, the remote server computer 140 can detect the portable device 145 based on receiving a message from the portable device 145, e.g., via the network 135. The vehicle computer 110 (or the remote server computer 140) can authorize the portable device 145, e.g., to prevent an unauthorized user from accessing and/or operating the vehicle 105.

Upon detecting the portable device 145, the vehicle computer 110 (or the remote server computer 140) may be programmed to authorize the portable device 145 based on a key, e.g., a combination of numbers and/or characters, received from the portable device 145. For example, the vehicle computer 110 (or the remote server computer 140) may authorize the portable device 145 based on determining the received key matches an expected key, e.g., known to certain parties such as vehicle 105 distributors, e.g., dealers, stored in the memory of the vehicle computer 110 (or the remote server computer 140). As another example, the authorized portable device 145 can have an RFID device or the like uniquely specifying the user from among other potential users who regularly use the vehicle 105. The RFID signal can be associated with the user in memory of the vehicle computer 110 (or the remote server computer 140). As another example, the authorized portable device 145 can pair with, e.g., the HMI 118. The authorized portable device 145 can be associated with the user in memory.

Upon receiving the initial enrollment biometric data, the vehicle computer 110 can be programmed to initiate biometric enrollment for the user based on receiving a message from the second computer 140, 145 specifying initiation of biometric enrollment. For example, the second computer 140, 145 can provide the message in a same or different transmission as the initial enrollment biometric data. Alternatively, the vehicle computer 110 may initiate biometric enrollment based on receiving a user input, e.g., via the HMI 118. Biometric enrollment in this document means generating user data based on obtaining enrollment, i.e., baseline, biometric data for a given user.

During biometric enrollment, the vehicle computer 110 generates user data for the user. For example, the vehicle computer 110 can maintain a look-up table or the like, e.g., stored in the memory of the vehicle computer 110, that associates the authenticated user with the corresponding biometric data. Upon determining to initiate biometric enrollment, the vehicle computer 110 can update the look-up table to associate the identified user with the initial enrollment biometric data. The vehicle computer 110 can control vehicle 105 operation based on the user data for the user.

The vehicle computer 110 can store, e.g., in a memory, user data for each of a plurality of potential users. The user data can keep track of authorized users, i.e., users that have permission to access the vehicle 105, and the user data can update over time as biometric data for the user changes, e.g., due to weight gain or loss, age, hair growth or loss, etc. User data includes biometric data for the respective user and a user authorization for the respective user. A user authorization, as used herein, specifies one or more vehicle 105 features that a user has permission to access and/or one or more operating parameters that a user has permission to control.

In the context of this document a "vehicle feature" is a setting of a vehicle component 125 that can be selected by user input, e.g., via the HMI 118. Non-limiting examples of vehicle 105 features include heating and/or cooling seats, climate control, e.g., in multiple zones or areas of the passenger cabin 200, heating a steering wheel, auto-dimming a rearview mirror, heating side mirrors, multi-color lighting, controlling a radio, controlling a moonroof, etc.

In the context of this document an "operating parameter" is an actual value of a measurement of a physical characteristic of a vehicle 105 or an environment around that vehicle 105 during vehicle operation. A variety of operating parameters may be determined during vehicle 105 operation. A non-limiting list of operating parameters includes a speed of the vehicle 105, a following distance between vehicles, a stopping location, an acceleration rate of the vehicle 105, a vehicle 105 destination, a vehicle 105 route, etc.

In an example in which the structure is a building, the user authorization may specify the building, or a room therein, that a user is permitted or prevented from entering. Additionally, or alternatively, the user authorization may specify one or more controls for the building that the user is permitted or prevented from controlling, e.g., light controls, heating controls, cooling controls, speaker controls, etc.

Additionally, during biometric enrollment, the vehicle computer 110 may be programmed to generate the user data to include a predetermined user authorization. The predetermined authorization may be stored, e.g., in the memory of the vehicle computer 110. The predetermined authorization may be specified by a vehicle 105 and/or component 125 manufacturer to permit limited access to (i.e., access to some but not all features of) the vehicle 105, e.g., control vehicle locks to allow a user to enter the passenger cabin 200 but prevent the user from operating the vehicle 105 and/or adjusting vehicle 105 features.

Upon generating the user data for the user, the vehicle computer 110 can, for example, initiate a timer. A duration of the timer may be a predetermined amount of time, e.g., determined empirically based on testing that allows for determining an average amount of time for various users to attempt to access the vehicle 105 upon providing initial enrollment biometric data. If the vehicle computer 110 does not biometrically authorize the user prior to expiration of the timer, then the vehicle computer 110 can determine to delete the user data for the user. In such an example, the vehicle computer 110 can provide a message to the second computer 140, 145, e.g., via the network 135, specifying that biometric enrollment was unsuccessful and/or to re-initiate biometric enrollment. If the vehicle computer 110 biometrically authorizes the user prior to expiration of the timer, then the vehicle computer 110 can maintain the user data. Maintaining the user data herein means keeping the user data, e.g., stored in the memory of the vehicle computer 110.

The vehicle computer 110 is programmed to biometrically authorize the user based on second biometric data, i.e., challenge biometric data for the user. Challenge biometric data herein means biometric data obtained from a user in real-time or near real-time to compare to stored biometric data to perform biometric authorization for the user. Challenge biometric data is obtained after generation of the user data for the user based on the initial enrollment biometric data. Challenge biometric data is obtained while the user is outside the vehicle 105 (see FIG. 2). For example, the vehicle computer 110 can detect the user around the vehicle 105 based on data from the external sensor 115*a*. For example, the vehicle computer 110 can monitor data from the external sensor 115*a* to detect a user has moved into the field of view of the external sensor 115*a*.

To obtain challenge biometric data, the vehicle computer 110 may be programmed to determine a location of the user external to the passenger cabin 200. The vehicle computer 110 may, for example, determine the location of the user based on the authorized portable device 145. For example, the vehicle computer 110 may receive location data of the authorized portable device 145 and determine the user's location based on the received location data. As another example, the vehicle computer 110 can detect the user via sensor 115 data. In such an example, the vehicle computer 110 can determine the location of the user based on the user being detected in field(s) of view of one or more external sensors 115*a*. For example, the vehicle computer 110 can determine the user is outside of the passenger cabin 200 and adjacent to a driver's door based on data from an external sensor 115*a*, as shown in FIG. 2. The fields of view of the external sensors 115*a* may be stored, e.g., in a memory of the vehicle computer 110.

Upon determining the location of the user, the vehicle computer 110 may be programmed to provide instructions to the user to provide the challenge biometric data. The instructions may specify actions for the user to perform, e.g., to interact with, such as face and/or touch, a specified sensor, to adjust a user pose relative to a specified sensor, to remove accessories, such as hats, glasses, etc., to speak a word or phrase, etc., to allow the vehicle computer 110 to obtain biometric data for the user. The vehicle computer 110 can, for example, actuate the HMI 118 to output the instructions, e.g., via a display, speakers, etc. As another example, the vehicle computer 110 can provide the instructions to the authorized portable device 145, and the authorized portable device 145 can output the instructions via the output device(s) 147.

Based on the user's location, the vehicle computer 110 can actuate one or more sensors 115 to obtain the challenge biometric data for the user. For example, the vehicle computer 110 can actuate sensor(s) 115 positioned to face the user outside the vehicle 105. The vehicle computer 110 can actuate various sensors 115 to obtain corresponding types of biometric data. For example, the vehicle computer 110 can actuate an image sensor 115 to obtain image data including facial characteristics of the user. Additionally, or alternatively, the vehicle computer 110 can actuate a capacitive touch sensor 115 to obtain data including a fingerprint of the user. The vehicle computer 110 can, for example, validate the biometric data by employing known watermarking techniques that encrypt data strings that indicate validity of the biometric data and include the encrypted data strings in the biometric data.

Upon obtaining the challenge biometric data, the vehicle computer 110 performs biometric authorization using the challenge biometric data and the user data. Authorizing the user means determining that the user has permission to access the vehicle 105; a failure to authorize occurs upon a determination that the user lacks permission to access the vehicle 105.

Biometric facial recognition is described herein as one non-limiting example of biometric authorization. Biometric facial recognition typically operates by calculating physiological characteristics of a human face and comparing the calculated physiological characteristics to stored physiological characteristics from the trained model. Physiological characteristics can include measures of facial features such as the distance between pupils, distance between corners of the mouth and length of nose, etc. These measures can be normalized by forming ratios of the measurements and stored as the trained model. At challenge time, an image of the human seeking access is acquired and processed to extract physiological characteristics which are then compared to stored physiological characteristics to determine a match. Other non-limiting examples of biometric authorization can include fingerprint recognition, eye recognition, voice recognition, etc.

Biometric authorization software can be executed on the vehicle computer 110 or the sensor 115 data, e.g., image data, can be uploaded to a remote server computer 140 that maintains a database of trained models for execution. An example of biometric authorization software is facial identification software, for example Face Tracker. Face Tracker is a facial recognition software library written in C++ and available on facetracker.net under the MIT software license.

Facial identification software can determine two sets of facial features corresponding to a challenge image and an enrollment image and determine ratios of distances between features. Facial identification software can determine a confidence score by determining a match value with previously determined facial identification features. A user status can be determined by comparing the confidence score to a first confidence threshold. The first confidence threshold can be determined empirically, e.g., based on testing that allows for determining a threshold that minimizes a number of incorrectly authorized users.

Facial features include locations on a facial image such as inner and outer corners of the eyes and corners of the mouth. For example, facial feature detection routines such as SURF in the Dlib image processing library can determine locations on a face corresponding to facial features such as the center of each eye and the center of a mouth. The facial identification software can compare the ratios based on the two sets of features and determine a match value. If the ratios between sets of features match, meaning that they have the same value within an empirically determined tolerance, the person in the challenge image is determined to be the same person as in the previously acquired enrollment image.

The match value can be determined by determining a mean squared difference between the two sets of ratios. Matching the ratios of distances can reduce the variance in facial feature measurements caused by differences due to differences in distances from the camera and differences in poses between the two images.

The confidence score can be determined by multiplying the match value by a scalar constant that maps the match value to the interval (0,1), with values close to 1 corresponding to a good match and values close to 0 corresponding to a poor match. The scalar constant can be determined empirically by acquiring and testing a plurality of enrollment and challenge images.

A confidence score greater than, i.e., exceeding, the first confidence threshold can indicate that the challenge biometric data is a good match for the initial enrollment biometric data, therefore the user status should be "authorized." A confidence score less than or equal to the first confidence threshold can indicate that the challenge biometric data did not match the initial enrollment biometric data, and therefore user status should be set to "not authorized." A confidence score less than or equal to the first confidence threshold can indicate problems with the initial enrollment biometric data, e.g., an unauthorized user passed facial identification, or an authorized user failed facial identification.

Upon determining that the user is authorized, the vehicle computer 110 can control the vehicle 105 based on the predetermined user authorization. For example, the vehicle computer 110 control vehicle 105 locks to permit the user to access areas of the vehicle 105, e.g., a driver seat, a passenger seat, a rear seat, etc., specified by the predetermined user authorization. The vehicle computer 110 can then detect the user is inside the passenger cabin 200 (see FIG. 3) based on data from the internal sensor 115b. For example, the vehicle computer 110 can monitor data from the internal sensor 115b to detect a user has moved into the field of view of the internal sensor 115b.

Figure 3:
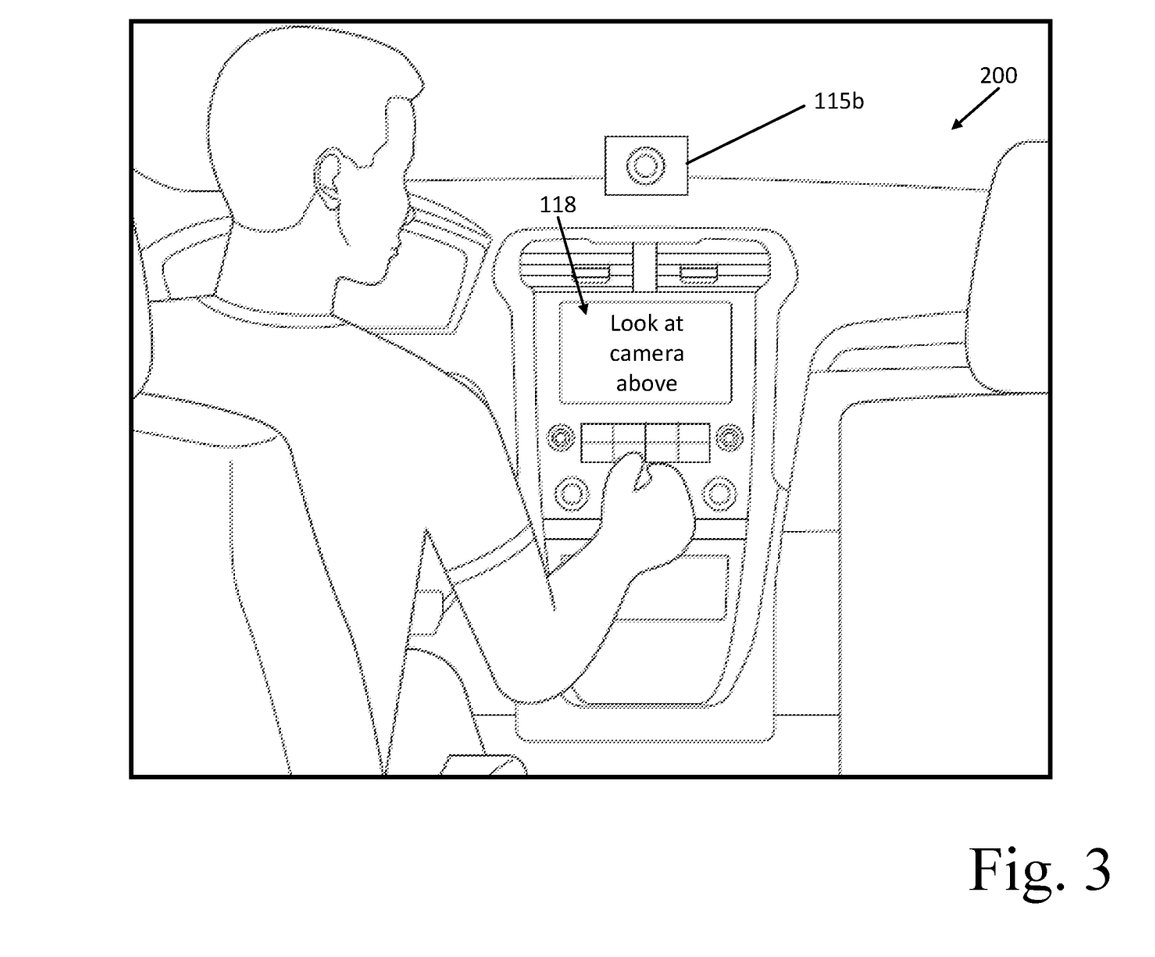
FIG. 3 is a diagram illustrating a user in the exemplary passenger cabin of the vehicle.

Upon detecting the user inside the passenger cabin 200, the vehicle computer 110 can authenticate the user based on detecting an authenticator. Authenticating the user means to validating or proving the identity of the user, a failure to authenticate occurs upon a determination that the user's identity cannot be validated, i.e., proved. The authenticator may, for example, be the authorized portable device 145. In this situation, the vehicle computer 110 may authenticate the user based on detecting the authorized portable device 145 within a predetermined distance of the vehicle 105. For example, the vehicle computer 110 can detect the authorized portable device 145 based on detecting the return of an RF signal, as discussed above. The vehicle computer 110 can determine a distance between the detected portable device 145 and the vehicle computer 110 based on the detected RF signal. For example, the vehicle computer 110 can determine the distance by using a time-of-flight measurement. For example, the vehicle computer 110 can calculate the distance based on an amount of time between transmission of the RF signal and detecting the return of the transmitted RF signal. Other non-limiting examples of techniques to determine the distance include RSSI (Receiver Signal Strength Indication), AoA (Angle of Arrival), Phase of the RF message, etc.

Upon detecting a portable device 145, the vehicle computer 110 can compare the distance between the portable device 145 and the vehicle computer 110 to the predetermined distance. The predetermined distance specifies a maximum distance from a vehicle 105 within which the vehicle computer 110 can identify a user. The predetermined distance may be determined empirically, e.g., based on testing that allows for determining a distance from the vehicle 105 that indicates the detected user is likely to seek access to the vehicle 105. The predetermined distance may be stored, e.g., in a memory of the vehicle computer 110.

If the distance is greater than the predetermined distance, then the vehicle computer 110 can ignore the detected portable device 145. Additionally, the vehicle computer 110 can determine to not authenticate the user. If the distance is less than or equal to the predetermined distance, then the vehicle computer 110 can determine to authenticate the user.

As another example, the authenticator may be a user input specifying identifying information for the user, e.g., a username and a password. For example, the vehicle computer 110 can actuate the HMI 118 to display virtual buttons corresponding to alphanumeric characters that the user can select to provide the identifying information. In other words, the HMI 118 may activate sensors that can detect the user selecting virtual buttons to specify the user's identifying information.

Upon detecting the user input, the HMI 118 can provide the user input to the vehicle computer 110, and the vehicle computer 110 can authenticate the user based on the user input. For example, the vehicle computer 110 can compare the identifying information specified by the user input to identifying information stored, e.g., in a memory of the vehicle computer 110. If the retrieved identifying information matches the stored identifying information, then the vehicle computer 110 determines to authenticate the user. In this context, "match" means retrieved identifying information identifies a same user as stored identifying information. If the retrieved identifying information does not match the stored identifying information, then the vehicle computer 110 determines to not authenticate the user.

Upon determining to not authenticate the user, the vehicle computer 110 can control vehicle components 125 to prevent operation of the vehicle 105. Additionally, the vehicle computer 110 can control vehicle components 125, e.g., disabling virtual buttons on the HMI 118, to prevent the user from accessing and/or updating user data stored in the memory of the vehicle computer 110.

Upon authenticating the user, the vehicle computer 110 can obtain updated enrollment biometric data for the user. Updated enrollment biometric data herein means biometric data obtained by vehicle 105 sensors 115 to update biometric enrollment of the user. Updated enrollment biometric data is obtained after biometrically authorizing the user based on the challenge biometric data. Updated enrollment biometric data may be obtained while the user is inside the passenger cabin 200. The vehicle computer 110 can actuate one or more sensors 115 to obtain the updated enrollment biometric data for the user. For example, the vehicle computer 110 can actuate sensor(s) 115 positioned to face the user inside the passenger cabin 200. The vehicle computer 110 can actuate various sensors 115 to obtain corresponding types of biometric data, as discussed above. Additionally, the vehicle computer 110 may be programmed to provide instructions (as discussed above) to the user to provide the updated enrollment biometric data. In this situation, the vehicle computer 110 can actuate the HMI 118 to output the instructions to the user (see FIG. 3).

The vehicle computer 110 is programmed to biometrically authorize the user based on the updated enrollment biometric data. That is, the vehicle computer 110 can perform biometric authorization using the updated enrollment biometric data and the user data. The vehicle computer 110 can determine a confidence score for the updated enrollment biometric data, e.g., as discussed above regarding determining a confidence score for the challenge biometric data. The vehicle computer 110 can then compare the confidence score for the updated enrollment biometric data to a second confidence threshold. That is, the vehicle computer 110 uses the first confidence threshold to biometrically authorize the user based on the challenge biometric data and uses the second confidence threshold to biometrically authorize the user based on the updated enrollment biometric data and future challenge biometric data (as discussed below). The second confidence threshold exceeds the first confidence threshold, as set forth above. If the confidence score for the updated enrollment biometric data exceeds the second confidence threshold, then the vehicle computer 110 can biometrically authorize the user. In this situation, the vehicle computer 110 can update the user data to include the updated enrollment biometric data. For example, the vehicle computer 110 can update the look-up table to associate the user with the updated enrollment biometric data.

Additionally, the vehicle computer 110 can update the user data to include a second predetermined user authorization. The second predetermined user authorization may be specified by the vehicle 105 and/or component 125 manufacturer permit the user to operate the vehicle 105 and/or adjust vehicle 105 features. The second predetermined user authorization may be stored, e.g., in a memory of the vehicle computer 110.

If the confidence score for the updated enrollment biometric data is less than or equal to the second confidence threshold, then the vehicle computer 110 can prevent actuation of one or more vehicle components 125, e.g., so as to prevent operation of the vehicle 105 and/or adjustment of one or more vehicle 105 features. In such an example, the vehicle computer 110 can provide a message to the second computer 140, 145, e.g., via the network 135, specifying that biometric enrollment was unsuccessful and/or to re-initiate biometric enrollment.

Upon updating the user data, the vehicle computer 110 can control the vehicle 105 based on the updated user data for the user, e.g., the second predetermined user authorization. For example, the vehicle computer 110 can actuate one or more vehicle components 125 to operate the vehicle 105 to satisfy the operating parameters specified by the second predetermined user authorization. As another example, the vehicle computer 110 can actuate one or more vehicle components 125 to adjust one or more vehicle 105 features specified by the second predetermined user authorization. Additionally, the vehicle computer 110 can actuate the HMI 118 to display virtual buttons corresponding to respective vehicle 105 features and operating parameters that the user can select to update the user authorization. In other words, the HMI 118 can actuate sensors to detect the user updating the user authorization. Upon detecting the user input, the HMI 118 can provide the user input to the vehicle computer 110, and the vehicle computer 110 can update the user authorization based on the user input.

The vehicle computer 110 can biometrically authorize the user at a future time. The future time is a time after biometric enrollment for the user is completed. At the future time, the vehicle computer 110 can detect the user based on sensor 115 data, as discussed above. The vehicle computer 110 can then obtain future challenge biometric data for the user, e.g., as discussed above regarding obtaining the challenge biometric data and the updated enrollment biometric data. Future challenge biometric data herein means biometric data obtained by vehicle 105 sensors 115 to biometrically authorize the user. Future challenge biometric data is obtained after updating the user data based on the updated enrollment biometric data. For example, the vehicle computer 110 can obtain the future challenge biometric data for the user while the user is outside the passenger cabin 200. The vehicle computer 110 can then biometrically authorize the user based on the future challenge biometric data. That is, the vehicle computer 110 can determine a confidence score for the future challenge biometric data, e.g., as discussed above. The vehicle computer 110 can then compare the future challenge biometric data to the second confidence threshold. If the confidence score for the future challenge biometric data exceeds the second confidence threshold, then the vehicle computer 110 can authorize the user. In this situation, the vehicle computer 110 can control the vehicle 105 based on the updated user data, as discussed above. If the confidence score for the future challenge biometric data is less than or equal to the second confidence threshold, then the vehicle computer 110 can actuate vehicle 105 locks to prevent the user from accessing the passenger cabin 200.

Additionally, or alternatively, the vehicle computer 110 can obtain the future challenge biometric data for the user while the user is inside the passenger cabin 200. In such an example, the vehicle computer 110 can biometrically authorize the user based on the future challenge biometric data and the second confidence threshold, as just discussed above. In this situation, if the confidence score for the future challenge biometric data is less than or equal to the second confidence threshold, then the vehicle computer 110 can prevent operation of the vehicle 105, as discussed above.

The authorized portable device 145 can be programmed to receive, from the vehicle computer 110, instructions for the user to provide biometric data (as discussed above). For example, the authorized portable device 145 can monitor the network 135 to detect the instructions. Upon receiving the instructions, the authorized portable device 145 can provide the instructions to the user (see FIG. 4). For example, the authorized portable device 145 can instruct the HMI 150 to actuate one or more output devices 147, e.g., a display, speakers, etc., to output the instructions to the user. The instructions specify actions for the user to perform, e.g., to interact with, such as face and/or touch, a specified sensor, to adjust a user pose relative to a specified sensor, to remove accessories, such as hats, glasses, etc., to speak a word or phrase, etc., to provide the initial enrollment biometric data.

The authorized portable device 145 can obtain the initial enrollment biometric data for the user by actuating one or more sensors in response to a user input. For example, the authorized portable device 145 can actuate the HMI 150 to display a virtual button that the user can select to actuate a sensor on the authorized portable device 145. In other words, the HMI 150 may activate sensors that can detect the user selecting the virtual button to obtain the initial enrollment biometric data. Upon detecting the user input, the authorized portable device 145 can actuate a sensor, e.g., a camera, to obtain the initial enrollment biometric data, e.g., image data, for the user.

Upon obtaining the initial enrollment biometric data for the user, the authorized portable device 145 can store the initial enrollment biometric data, e.g., in a memory. The authorized portable device 145 can be programmed to then provide the initial enrollment biometric data to the vehicle computer 110 or the remote server computer 140. For example, the authorized portable device 145 can receive a message requesting the initial enrollment biometric data from the vehicle computer 110 or the remote server computer 140, e.g., via the network 135. The authorized portable device 145 can provide the initial enrollment biometric data, e.g., via the network 135, in response to the message. The authorized portable device 145 can encrypt the initial enrollment biometric data, e.g., according to known encryption techniques, prior to providing the initial enrollment biometric data to the vehicle computer 110 or the remote server computer 140. In this situation, the vehicle computer 110 or the remote server computer 140 can decrypt the initial enrollment biometric data, e.g., according to known decryption techniques, upon receiving the initial enrollment biometric data.

In the example in which the authorized portable device 145 provides the initial enrollment biometric data to the vehicle computer 110, the authorized portable device 145 can initiate a second timer. A duration of the second timer may be a predetermined amount of time, e.g., determined empirically based on testing that allows for determining an amount of time that allows data to be shared between vehicle computers and portable devices while minimizing a likelihood of the data being accessed by an unauthorized source.

The vehicle computer 110 can provide a confirmation message, e.g., via the network 135, in response to receiving the initial enrollment biometric data. If the authorized portable device 145 does not provide the initial enrollment biometric data to the vehicle computer 110 or receive the confirmation message prior to expiration of the second timer, then the authorized portable device 145 can delete the initial enrollment biometric data. Additionally, upon providing the initial enrollment biometric data to the vehicle computer 110 and receiving the confirmation message from the vehicle computer 110 prior to expiration of the second timer, the authorized portable device 145 can delete the initial enrollment biometric data.

In the example in which the authorized portable device 145 provides the initial enrollment biometric data to the remoter server computer 140, the remoter server computer 140 can store the initial enrollment biometric data, e.g., in a memory. Additionally, the remote server computer 140 can initiate the second timer upon receiving the initial enrollment biometric data. The remote server computer 140 can then provide the initial enrollment biometric data to the vehicle computer 110 in response to receiving the message requesting the initial enrollment biometric data from the vehicle computer 110, e.g., via the network 135. The vehicle computer 110 can provide a confirmation message, e.g., via the network 135, in response to receiving the initial enrollment biometric data. The remote server computer 140 can delete the initial enrollment biometric data based on providing the initial enrollment biometric data to the vehicle computer 110 and receiving the confirmation message prior to expiration of the second timer. Additionally, or alternatively, the remote server computer 140 can delete the initial enrollment biometric data based on failing to receive the confirmation message or failing to provide the initial enrollment biometric data to the vehicle computer 110 prior to expiration of the second timer.

The remote server computer 140 may be programmed to acquire the initial enrollment biometric data for the user. For example, the remote server computer 140 can receive the initial enrollment biometric data for the user from the authorized portable device 145, as just discussed above. As another example, the remote server computer 140 can receive a message from the authorized portable device 145, e.g., specifying a user input, that authorizes the remote server computer 140 to acquire the initial enrollment biometric data for a user associated with the authorized portable device 145. In such an example, the remote server computer 140 can query a database that associates biometric data, e.g., image data, with a plurality of users. The remote server computer 140 can select biometric data stored in the database that corresponds to the user associated with the authorized portable device 145. The remote server computer 140 can then store the acquired biometric data, e.g., in a memory, until expiration of the timer or receipt of the confirmation message, whichever occurs first in time.

Figure 5:
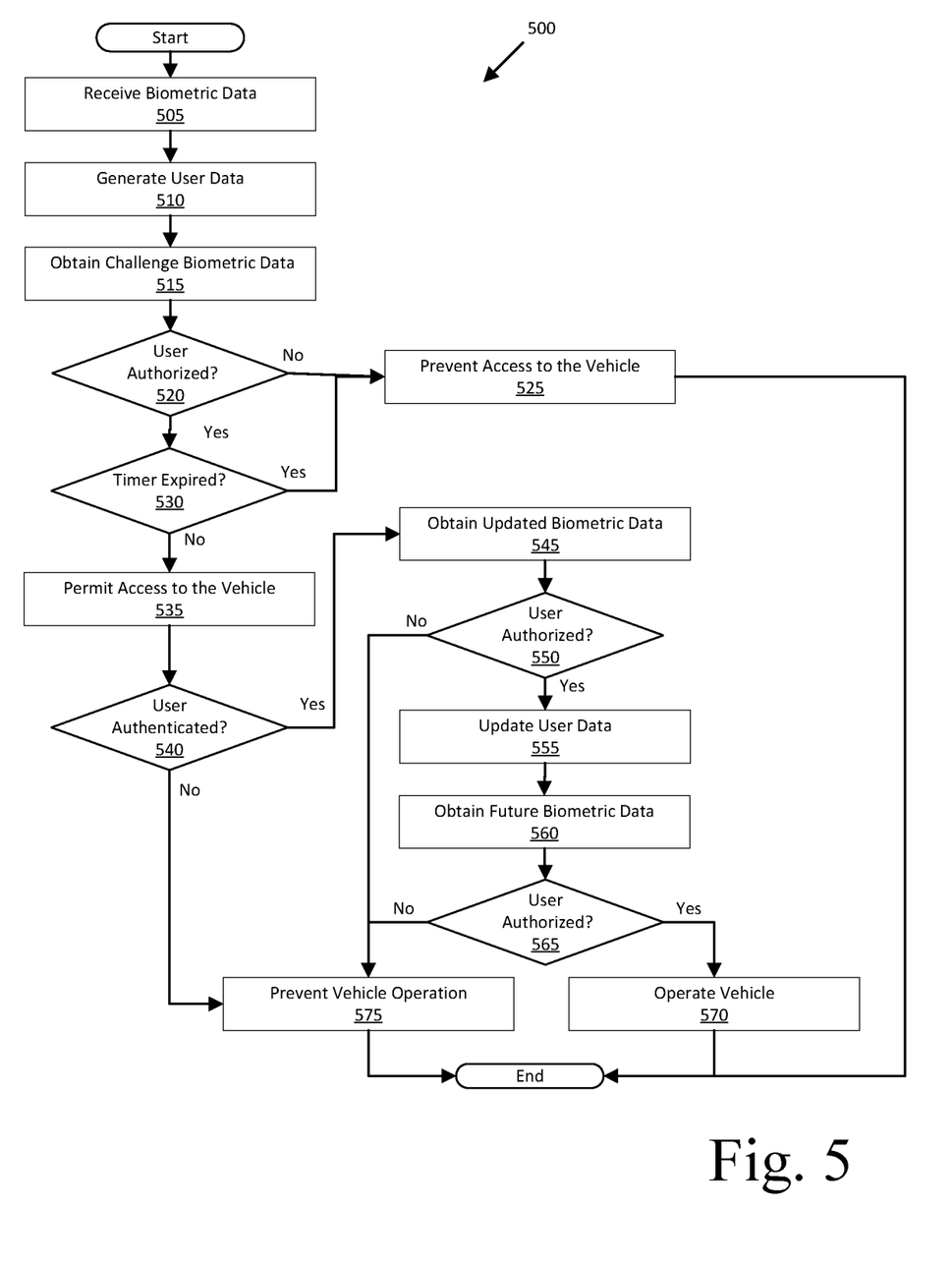
FIG. 5 is a flowchart of an example process for biometrically authorizing a user in a first computer.

FIG. 5 is a diagram of an example process 500 executed in a vehicle computer 110 according to program instructions stored in a memory thereof for biometrically authorizing a user. Process 500 includes multiple blocks that can be executed in the illustrated order. Process 500 could alternatively or additionally include fewer blocks or can include the blocks executed in different orders.

Process 500 begins in a block 505. In the block 505, the vehicle computer 110 receives, e.g., from an authorized portable device 145 or a remote server computer 140, initial enrollment biometric data for a user. For example, the vehicle computer 110 can monitor a network 135 to detect the initial enrollment biometric data for the user. The process 500 continues in a block 510.

In the block 510, the vehicle computer 110 generates user data based on the initial enrollment biometric data, as discussed above. That is, the vehicle computer 110 associates the initial enrollment biometric data with the user in a memory, as discussed above. The process 500 continues in a block 515.

In the block 515, the vehicle computer 110 obtains challenge biometric data for the user. Upon detecting the user approaching the vehicle 105 via data from external sensors 115*a*, the vehicle computer 110 can actuate one or more sensors 115 to obtain the challenge biometric data for the user, as discussed above. The process 500 continues in a block 520.

In the block 520, the vehicle computer 110 determines whether to authorize the user based on a first confidence threshold. The vehicle computer 110 performs biometric authorization for the user to determine a confidence score for the challenge biometric data, as discussed above. The vehicle computer 110 compares the confidence score for the challenge biometric data to a first confidence threshold, as discussed above. If the confidence score for the challenge biometric data exceeds the first confidence threshold, then the process 500 continues in a block 530. Otherwise, the process 500 continues in a block 525.

In the block 525, the vehicle computer 110 prevents the user from accessing the vehicle 105. For example, the vehicle computer 110 can actuate vehicle locks and/or windows to prevent the user from entering the passenger cabin 200. The process 500 ends following the block 525.

In the block 530, the vehicle computer 110 determines whether a timer has expired. The vehicle computer 110 can initiate the timer upon receiving the initial enrollment biometric data, as discussed above. If the timer has not expired, then the process 500 continues in a block 535. Otherwise, the process 500 continues in the block 525.

In the block 535, the vehicle computer 110 permits the user to access the vehicle 105. For example, the vehicle computer 110 can actuate vehicle 105 locks to permit the user to enter the passenger cabin 200. The process 500 continues in a block 540.

In the block 540, the vehicle computer 110 determines whether the user is authenticated. Upon detecting the user in the passenger cabin 200, e.g., via internal sensor 115*b* data, the vehicle computer 110 can authenticate the user based on detecting an authenticator, as discussed above. If the vehicle computer 110 authenticates the user, then the process 500 continues in a block 545. Otherwise, the process 500 continues in a block 575.

In the block 545, the vehicle computer 110 obtains updated enrollment biometric data for the user. Upon detecting the user in the passenger cabin 200, the vehicle computer 110 can actuate one or more sensors 115 to obtain the updated enrollment biometric data for the user, as discussed above. The process 500 continues in a block 550.

In the block 550, the vehicle computer 110 determines whether to authorize the user based on a second confidence threshold. The second confidence threshold is greater than the first confidence threshold, as set forth above. The vehicle computer 110 performs biometric authorization for the user to determine a confidence score for the updated enrollment biometric data, as discussed above. The vehicle computer 110 compares the confidence score for the updated enrollment biometric data to the second confidence threshold, as discussed above. If the confidence score for the updated enrollment biometric data exceeds the second confidence threshold, then the process 500 continues in a block 535. Otherwise, the process 500 continues in a block 575.

In the block 555, the vehicle computer 110 updates the user data to include the updated enrollment biometric data, as discussed above. The process 500 continues in a block 560.

In the block 560, the vehicle computer 110 can, at a future time, actuate one or more sensors to obtain the future challenge biometric data for the user, as discussed above. The process 500 continues in a block 565.

In the block 565, the vehicle computer 110 determines whether to authorize the user based on a second confidence threshold. The block 565 is substantially identical to the block 550 of the process 500 therefore will not be described further to avoid redundancy. If a confidence score for the future challenge biometric data exceeds the second confidence threshold, then the process 500 continues in a block 570. Otherwise, the process 500 continues in the block 575.

In the block 570, the vehicle computer 110 controls one or more vehicle components 125 based on the user data for the user, as discussed above. The process 500 ends following the block 570.

In the block 575, the vehicle computer 110 prevents the user from controlling and/or accessing the vehicle 105, as discussed above. The process 500 ends following the block 575.

Figure 6:
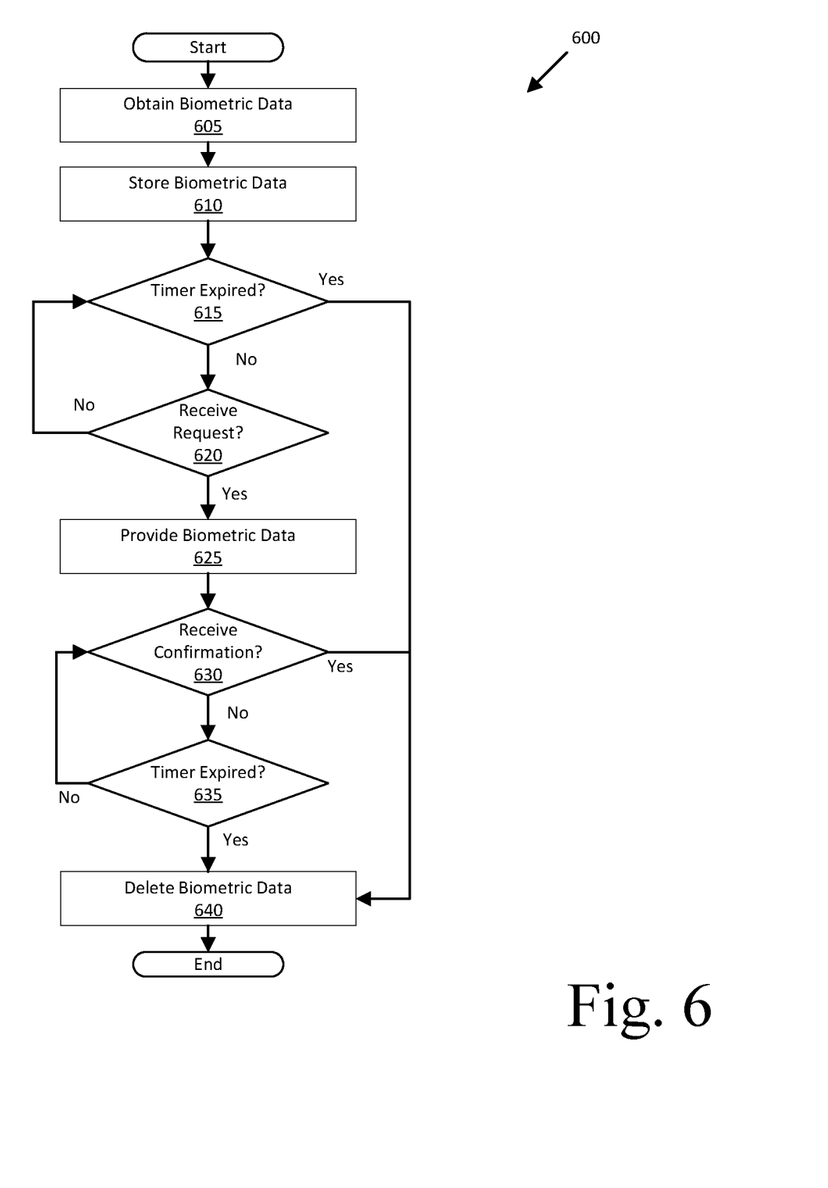
FIG. 6 is a flowchart of an example process for providing initial enrollment biometric data in a second computer.

FIG. 6 is a diagram of an example process 600 executed in a second computer 140, 145 according to program instructions stored in a memory thereof for providing initial enrollment biometric data to the vehicle computer 110. As set forth above, the second computer 140, 145 may be one of a remote server computer 140 or an authorized portable device 145. Process 600 includes multiple blocks that can be executed in the illustrated order. Process 600 could alternatively or additionally include fewer blocks or can include the blocks executed in different orders.

Process 600 begins in a block 605. In the block 605, the second computer 140, 145 obtains initial enrollment biometric data for a user. In an example in which the second computer 140, 145 is an authorized portable device 145, the authorized portable device 145 can actuate one or more sensors, e.g., in response to detecting a user input, to obtain the initial enrollment biometric data, as discussed above. In an example in which the second computer 140, 145 is a remote server computer 140, the remote server computer 140 can receive the initial enrollment biometric data from the authorized portable device 145, e.g., via the network 135, as discussed above. The process 600 continues in a block 610.

In the block 610, the second computer 140, 145 stores the initial enrollment biometric data in a memory. The process 600 continues in a block 615.

In the block 615, the second computer 140, 145 determines whether a second timer has expired. The second computer 140, 145 can initiate the second timer upon obtaining the initial enrollment biometric data, as discussed above. If the second timer has not expired, then the process 600 continues in a block 620. Otherwise, the process 600 continues in a block 640.

In the block 620, the second computer 140, 145 determines whether a request for the initial enrollment biometric data has been received. For example, the second computer 140, 145 can monitor the network 135 to detect the request from the vehicle computer 110. If the second computer 140, 145 determines that the request has been received, then the process 600 continues in a block 625. Otherwise, the process 600 returns to the block 615.

In the block 625, the second computer 140, 145 provides the initial enrollment biometric data to the vehicle computer 110. For example, the second computer 140, 145 can transmit the initial enrollment biometric data to the vehicle computer 110, e.g., via the network 135. The process 600 continues in a block 630.

In the block 630, the second computer 140, 145 determines whether a confirmation message has been received. For example, the second computer 140, 145 can monitor the network 135 to detect the confirmation message from the vehicle computer 110. If the second computer 140, 145 determines that the confirmation message has been received, then the process 600 continues in the block 640. Otherwise, the process 600 continues in a block 635.

In the block 635, the second computer 140, 145 determines whether the second timer has expired. If the second timer has not expired, then the process 600 returns to the block 630. Otherwise, the process 600 continues in the block 640.

In the block 640, the second computer 140, 145 deletes the initial enrollment biometric data from the memory. The process 600 ends following the block 640.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
a communication network; and
a first computer and a second computer each connected to the communication network;
wherein the first computer is programmed to:
generate user data for a user based on receiving, from the second computer, initial enrollment biometric data for the user;
authenticate the user based on a confidence score for challenge biometric data exceeding a first confidence threshold;
then update the user data with updated enrollment biometric data based on a confidence score for the updated enrollment biometric data exceeding a second confidence threshold, wherein the second confidence threshold is greater than the first confidence threshold; and
perform a comparison of the confidence score for the updated enrollment biometric data to the second confidence threshold and prevent the user from operating controls for a structure based on determining from the comparison that the confidence score for the updated enrollment biometric data does not exceed the second confidence threshold.

2. The system of claim 1, wherein the first computer is further programmed to, upon authenticating the user, permit the user to access a structure.

3. The system of claim 1, wherein the first computer is further programmed to prevent the user from accessing a structure based on failing to authenticate the user within a second predetermined time of receiving the initial enrollment biometric data.

4. The system of claim 1, wherein the first computer is further programmed to, upon determining to not authenticate the user, prevent the user from accessing a structure.

5. The system of claim 1, wherein the first computer is further programmed to, upon updating the user data, permit the user to access a structure based on the updated user data.

6. The system of claim 1, wherein the first computer is further programmed to update the user data based additionally on receiving a user input.

7. The system of claim 1, wherein the first computer is further programmed to update the user data based additionally on authorizing a portable device associated with the user.

8. The system of claim 1, wherein the first computer is further programmed to:
after updating the user data, obtain future challenge biometric data based on detecting the user; and
authorize the user based on a confidence score for the future challenge biometric data exceeding the second confidence threshold.

9. The system of claim 8, wherein the first computer is further programmed to, upon authorizing the user, permit the user to at least one of access a structure and operate controls for the structure on the updated user data.

10. The system of claim 8, wherein the first computer is further programmed to, upon determining to not authorize the user, prevent the user from accessing a structure.

11. The system of claim 8, wherein the future challenge biometric data is obtained from at least one of exterior sensors positioned to face an environment around a structure and interior sensors positioned to face an area defined by the structure.

12. The system of claim 1, wherein the challenge biometric data is obtained from exterior sensors positioned to face an environment around a structure, and the updated enrollment biometric data is obtained from the exterior sensors and interior sensors positioned to face an area defined by the structure.

13. The system of claim 1, wherein the second computer is further programmed to delete the initial enrollment biometric data based on providing the initial enrollment biometric data to the first computer.

14. The system of claim 1, wherein the second computer is further programmed to receive the initial enrollment biometric data from a third computer.

15. The system of claim 1, wherein the second computer is programmed to delete the initial enrollment biometric data after a predetermined time of receiving the initial enrollment biometric data.

16. A method, comprising:
generating, at a first computer, user data for a user based on receiving, from a second computer, initial enrollment biometric data for the user;
authenticating the user based on a confidence score for challenge biometric data exceeding a first confidence threshold;
then updating the user data with updated enrollment biometric data based on a confidence score for the updated enrollment biometric data exceeding a second confidence threshold, wherein the second confidence threshold is greater than the first confidence threshold; and
performing a comparison of the confidence score for the updated enrollment biometric data to the second confidence threshold and preventing the user from operating controls for a structure based on determining from the comparison that the confidence score for the updated enrollment biometric data does not exceed the second confidence threshold.

17. The method of claim 16, further comprising:
after updating the user data, obtaining, at the first computer, future challenge biometric data based on detecting the user; and
authorizing the user based on a confidence score for the future challenge biometric data exceeding the second confidence threshold.

18. The method of claim 17, further comprising, upon authorizing the user, permitting, at the first computer, the user to at least one access a structure and to operate controls for the structure based on the updated user data.

19. The method of claim 16, further comprising deleting, at the second computer, the initial enrollment biometric data based on providing the initial enrollment biometric data to the first computer.

20. The method of claim 16, further comprising deleting, at the second computer, the initial enrollment biometric data after a predetermined time of receiving the initial enrollment biometric data.

\* \* \* \* \*